(12) United States Patent
Wang

(10) Patent No.: US 10,383,097 B2
(45) Date of Patent: Aug. 13, 2019

(54) DATA TRANSMISSION METHOD AND SYSTEM, AND DEVICE

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 15/570,295

(22) PCT Filed: Apr. 29, 2015

(86) PCT No.: PCT/CN2015/077836
§ 371 (c)(1),
(2) Date: Oct. 27, 2017

(87) PCT Pub. No.: WO2016/072887
PCT Pub. Date: Nov. 3, 2016

(65) Prior Publication Data
US 2018/0139741 A1    May 17, 2018

(51) Int. Cl.
*H04W 72/04*      (2009.01)
*H04L 12/741*      (2013.01)
(Continued)

(52) U.S. Cl.
CPC ......... *H04W 72/0406* (2013.01); *H04L 45/74* (2013.01); *H04W 72/1278* (2013.01); *H04W 88/04* (2013.01)

(58) Field of Classification Search
CPC ............ H04W 72/0406; H04W 88/04; H04W 72/1278; H04W 72/1284; H04W 72/1289; H04L 45/74; H04L 45/741
See application file for complete search history.

(56) References Cited

U.S. PATENT DOCUMENTS 9,912,588 B2 * 3/2018 Barrett .................... H04L 45/74
2013/0273923 A1 * 10/2013 Li .......................... H04W 28/02
                                                                                                           455/450
(Continued)

FOREIGN PATENT DOCUMENTS

CN        103650624 A      3/2014
CN        104185299 A     12/2014
EP          3270654 A1      1/2018

OTHER PUBLICATIONS

"3rd Generation Partnership Project; Technical Specification Group Services and System Aspects; Feasibility study for Proximity Services (ProSe) (Release 12)", Technical Report, 3GPP TR 22.803 V12.2.0 (dated Jun. 2013), Jun. 2013, 45 pages.
(Continued)

*Primary Examiner* — Kevin D Mew

(57) ABSTRACT

Embodiments of the present invention disclose a data transmission method and system, and a device. The method includes: obtaining, by a transmission device, configuration information sent by a base station; receiving, by the transmission device, scheduling assignment SA signaling sent by at least one sending device; receiving, by the transmission device, first data, where the first data is the data indicated by the SA signaling that is received by the transmission device from the at least one sending device; and sending, by the transmission device, relay data, where the relay data is one or more pieces of data of the first data. The embodiments of the present invention are used for D2D communication.

8 Claims, 8 Drawing Sheets

(51) Int. Cl.
*H04W 72/12* (2009.01)
*H04W 88/04* (2009.01)

(56) References Cited

U.S. PATENT DOCUMENTS

| | | | | |
|---|---|---|---|---|
| 2014/0036769 | A1* | 2/2014 | Stojanovski | H04W 4/70 370/328 |
| 2014/0092800 | A1* | 4/2014 | Cho | H04W 72/04 370/311 |
| 2014/0094180 | A1 | 4/2014 | Zhou et al. | |
| 2014/0128092 | A1 | 5/2014 | Xiong et al. | |
| 2015/0029977 | A1* | 1/2015 | Seok | H04W 76/14 370/329 |
| 2015/0341794 | A1* | 11/2015 | Vanderveen | G06Q 30/0261 705/14.58 |
| 2015/0341856 | A1* | 11/2015 | Nord | H04W 76/14 455/426.1 |
| 2016/0044613 | A1* | 2/2016 | Cai | H04W 56/00 370/315 |
| 2016/0119739 | A1* | 4/2016 | Hampel | H04W 4/70 370/315 |
| 2017/0079083 | A1* | 3/2017 | Siomina | H04W 76/14 |
| 2017/0093541 | A1* | 3/2017 | Pan | H04L 5/0048 |
| 2018/0027429 | A1* | 1/2018 | Li | H04W 40/22 455/426.1 |
| 2018/0234163 | A1* | 8/2018 | Yasukawa | H04W 16/26 |
| 2018/0255499 | A1* | 9/2018 | Loehr | H04B 7/2606 |
| 2018/0295671 | A1* | 10/2018 | Kim | H04W 4/06 |

OTHER PUBLICATIONS

CATT; "Considerations about ProSe UE-UE Relays", SA WG2 Meeting #104; S2-142853; Jul. 7-11, 2014; Dublin, Ireland; 4 pages.

Intel; "Solution for ProSe UE-to-UE Relay (stateless forwarding)"; SA WG2 Meeting #107; S2-150374; Jan. 26-31, 2015; Sorrento, Italy; 4 pages.

Alcatel-Lucent et al.; "Way forward on UE to UE relays"; SA WG2 Meeting #108; S2-151030; Apr. 13-17, 2015; San Jose Del Cabo, Mexico; 4 pages.

* cited by examiner

DATA TRANSMISSION METHOD AND SYSTEM, AND DEVICE

CROSS-REFERENCE TO RELATED APPLICATIONS

This application is a national stage of International Application No. PCT/CN2015/077836, filed on Apr. 29, 2015, which is hereby incorporated by reference in its entirety.

TECHNICAL FIELD

The present invention relates to the communications field, and in particular, to a data transmission method and system, and a device.

BACKGROUND

A device to device proximity service (English full name: Device to Device Proximity Service, D2D ProSe for short) has become a research subject of the 3rd Generation Partnership Project (English full name: 3rd Generation Partnership Project, 3GPP for short) Long Term Evolution (English full name: Long Term Evolution, LTE for short) system Release 12 (English full name: Release 12, Rel. 12 for short). A physical layer of an LTE system provides a direct connection service for user equipments based on an orthogonal frequency division multiplexing-multiple-input multiple-output (Orthogonal Frequency Division Multiplexing-Multiple-Input Multiple-Output, OFDM-MIMO) technology. In this way, not only a service scope of the LTE system is expanded, but also D2D communication between user equipments can be used by more users.

In an LTE D2D ProSe service, in an application scenario, a UE-to-UE relay method is used. That is, one UE relays data of another UE, to increase a transmission distance.

In the LTE D2D system, when sending a D2D signal, UE needs to send scheduling signaling on a scheduling assignment (English full name: scheduling assignment, SA for short) resource, and then sends a corresponding D2D signal in a data resource pool. When a D2D terminal sends scheduling signaling on an SA resource, the scheduling signaling includes a destination address of a signal to be sent.

Referring to FIG. 1, FIG. 1 shows an LTE D2D system. An LTE base station and four UEs are included in the system. To send a D2D signal, UE1 needs to send scheduling signaling on a corresponding SA resource, and sends a corresponding data signal in a data resource pool matching the SA resource. The scheduling signaling sent by the UE1 on the SA resource includes a destination address of the data signal. Assuming that the UE1 needs to communicate with UE3, the destination address is an address of the UE3.

If UE2 is used as a relay to forward the D2D signal sent by the UE1, the UE2 needs to first receive data sent by the UE1, and then send the received data. Therefore, when relaying the signal sent by the UE1, the UE2 needs to receive the SA scheduling signaling sent by the UE1. In addition, when relaying the signal sent by the UE1, the UE2 also needs to first send the scheduling signaling on an SA resource, and then send, in a data resource pool matching the SA resource, the data signal that needs to be relayed.

When relaying the D2D signal sent by the UE1, the UE2 also needs to receive, on an SA resource, the SA scheduling signaling sent by the UE1. In the prior art, to relay data sent by the UE1, the UE2 needs to receive all SA scheduling signaling on the SA resource, receive D2D data indicated by all the SA scheduling signaling, and then relay the received data. In this case, the UE2 may relay data that does not need to be relayed, resulting in resource and energy waste. In an extreme case, this may cause abnormal D2D communication.

SUMMARY

Embodiments of the present invention relate to the communications field, and provide a data transmission method and system, and a device, to control UE relaying data to selectively transmit relay data, thereby implementing normal D2D communication.

According to a first aspect, a data transmission method is provided, including:

obtaining, by a transmission device, configuration information sent by a base station, where the configuration information includes a second destination address, and the second destination address is an address of a receiving device performing D2D communication;

receiving, by the transmission device, scheduling assignment SA signaling sent by at least one sending device, where the SA signaling is used to indicate data sent by the sending device, the SA signaling includes a first destination address of the data, the first destination address is the same as the second destination address, and the first destination address is a destination address to which the data is sent;

receiving, by the transmission device, first data, where the first data is the data indicated by the SA signaling that is received by the transmission device from the at least one sending device; and sending, by the transmission device, relay data, where the relay data is one or more pieces of data of the first data.

With reference to the first aspect, in a first possible implementation, the first data includes a first source address, the configuration information further includes a second source address, and the first source address is an address of the sending device;

the method further includes:

determining, by the transmission device, second data in the first data, where the second data is one or more pieces of data of the first data, and the first source address included in the second data is the same as the second source address; and the relay data is one or more pieces of data of the second data.

With reference to the first aspect or the first possible implementation, in a second possible implementation, the configuration information further includes a side link-radio network temporary identifier SL-RNTI (English full name: Side Link-Radio Network Tempory Identity);

the method further includes:

receiving, by the transmission device according to the SL-RNTI, control signaling sent by the base station, where the control signaling indicates a resource location of SA signaling of the relay data and a resource location of the relay data; and transmitting, by the transmission device, the SA signaling that corresponds to the relay data in the resource location of the SA signaling of the relay data and according to the control signaling; and the sending, by the transmission device, relay data specifically includes: sending, by the transmission device, the relay data in the resource location of the relay data.

According to a second aspect, a data transmission method is provided, including:

obtaining, by a base station, a second destination address of a receiving device performing D2D communication; and sending, by the base station, configuration information to a transmission device, where the configuration information includes the second destination address, and the second destination address is used by the transmission device to obtain relay data sent by at least one sending device performing D2D communication with the receiving device.

With reference to the second aspect, in a first possible implementation, the configuration information further includes the second source address; and the method further includes:

obtaining, by the base station, the second source address of the sending device performing D2D communication, where the second source address is used by the transmission device to determine second data in first data, where the second data is one or more pieces of data of the first data, and a first source address included in the second data is the same as the second source address.

With reference to the second aspect or the first possible implementation, in a second possible implementation, the configuration information further includes an SL-RNTI; and the method further includes: allocating, by the base station, a resource location of SA signaling and a resource location of the relay data to the relay data; and sending, by the base station, resource control signaling to the transmission device according to the SL-RNTI, where the resource control signaling includes the resource location of the SA signaling and the resource location of the relay data allocated to the relay data.

According to a third aspect, a transmission device is provided, including:

a receiving unit, configured to obtain configuration information sent by a base station, where the configuration information includes a second destination address, and the second destination address is an address of a receiving device performing D2D communication, where the receiving unit is further configured to receive scheduling assignment SA signaling sent by at least one sending device, where the SA signaling is used to indicate data sent by the sending device, the SA signaling includes a first destination address, the first destination address is the same as the second destination address, and the first destination address is a destination address to which the data is sent; and the receiving unit is further configured to receive first data, where the first data is the data indicated by the SA signaling that is received by the transmission device from the at least one sending device; and a sending unit, configured to send relay data, where the relay data is one or more pieces of data of the first data.

With reference to the third aspect, in a first possible implementation, the first data includes a first source address, the configuration information further includes a second source address, and the first source address is an address of the at least one sending device; and the transmission device further includes:

a determining unit, configured to determine second data in the first data received by the receiving unit, where the second data is one or more pieces of data of the first data, the first source address included in the second data is the same as the second source address, and the relay data is one or more pieces of the second data.

With reference to the third aspect or the first possible implementation, in a second possible implementation, the configuration information further includes: aside link-radio network temporary identifier SL-RNTI;

the receiving unit is further configured to receive, according to the SL-RNTI, control signaling sent by the base station, where the control signaling indicates a resource location of SA signaling of the relay data and a resource location of the relay data;

the sending unit is configured to transmit the SA signaling that corresponds to the relay data in the resource location of the SA signaling of the relay data and according to the control signaling received by the receiving unit; and the sending unit is specifically configured to send the relay data in the resource location of the relay data.

According to a fourth aspect, a base station is provided, including:

a receiving unit, configured to obtain a second destination address of a receiving device performing D2D communication; and a sending unit, configured to send configuration information to a transmission device, where the configuration information includes the second destination address, and the second destination address is used by the transmission device to obtain relay data sent by at least one sending device performing D2D communication with the receiving device.

With reference to the fourth aspect, in a first possible implementation, the configuration information further includes the second source address; and the receiving unit is further configured to obtain the second source address of the sending device performing D2D communication, where the second source address is used by the transmission device to determine second data in first data, where the second data is one or more pieces of data of the first data, and a first source address included in the second data is the same as the second source address.

With reference to the fourth aspect or the first possible implementation, in a second possible implementation, the configuration information further includes an SL-RNTI;

the base station further includes a processing unit, configured to allocate a resource location of SA signaling and a resource location of the relay data to the relay data; and the sending unit is further configured to send resource control signaling to the transmission device according to the SL-RNTI, where the resource control signaling includes the resource location of the SA signaling and the resource location of the relay data allocated to the relay data.

According to a fifth aspect, a transmission device is provided, including: a first interface circuit, a second interface circuit, a memory, and a bus, where the first interface circuit, the second interface circuit, and the memory are connected and communicate with each other by using the bus;

the first interface circuit is configured to obtain configuration information sent by a base station, where the configuration information includes a second destination address, and the second destination address is an address of a receiving device performing D2D communication;

the first interface circuit is further configured to receive scheduling assignment SA signaling sent by at least one sending device, where the SA signaling is used to indicate data sent by the sending device, the SA signaling includes a first destination address, the first destination address is the same as the second destination address, and the first destination address is a destination address to which the data is sent;

the first interface circuit is further configured to receive first data, where the first data is the data indicated by the SA signaling that is received by the transmission device from the at least one sending device; and the second interface circuit is configured to send relay data, where the relay data is one or more pieces of data of the first data.

With reference to the fifth aspect, in a first possible implementation, the first data includes a first source address, the configuration information further includes a second source address, and the first source address is an address of the at least one sending device; the transmission device further includes a processor connected with the bus; and the processor is configured to determine second data in the first data received by the first interface circuit, where the second data is one or more pieces of data of the first data, the first source address included in the second data is the same as the second source address, and the relay data is one or more pieces of data of the second data.

With reference to the fifth aspect or the first possible implementation, in a second possible implementation, the configuration information further includes a side link-radio network temporary identifier SL-RNTI;

the first interface circuit is further configured to receive, according to the SL-RNTI, control signaling sent by the base station, where the control signaling indicates a resource location of SA signaling of the relay data and a resource location of the relay data;

the second interface circuit is configured to transmit the SA signaling that corresponds to the relay data in the resource location of the SA signaling of the relay data and according to the control signaling received by the first interface circuit; and the second interface circuit is specifically configured to send the relay data in the resource location of the relay data.

According to a sixth aspect, a base station is provided, including: a first interface circuit, a second interface circuit, a memory, and a bus, where the first interface circuit, the second interface circuit, and the memory are connected and communicate with each other by using the bus;

the first interface circuit is configured to obtain a second destination address of a receiving device performing D2D communication; and the second interface circuit is configured to send configuration information to a transmission device, where the configuration information includes the second destination address, and the second destination address is used by the transmission device to obtain relay data sent by at least one sending device performing D2D communication with the receiving device.

With reference to the sixth aspect, in a first possible implementation, the configuration information further includes the second source address; and the first interface circuit is further configured to obtain the second source address of the sending device performing D2D communication, where the second source address is used by the transmission device to determine second data in first data, where the second data is one or more pieces of data of the first data, and a first source address included in the second data is the same as the second source address.

With reference to the sixth aspect or the first possible implementation, in a second possible implementation, the configuration information further includes an SL-RNTI;

the base station further includes a processor connected to the bus, where the processor is configured to allocate a resource location of SA signaling and a resource location of the relay data to the relay data; and the second interface circuit is further configured to send resource control signaling to the transmission device according to the SL-RNTI, where the resource control signaling includes the resource location of the SA signaling and the resource location of the relay data allocated to the relay data.

According to a seventh aspect, a data transmission system is provided, including any transmission device according to the third aspect and any base station according to the fourth aspect; or any transmission device according to the fifth aspect and any base station according to the sixth aspect.

In the data transmission method and system, and the device provided above, a transmission device can selectively receive SA signaling of a sending device according to a second destination address in configuration information that is sent by a base station, and determine to-be-sent relay data in first data that is obtained according to the received SA signaling. In this way, UE relaying data can be controlled to selectively transmit relay data, to implement normal D2D communication.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
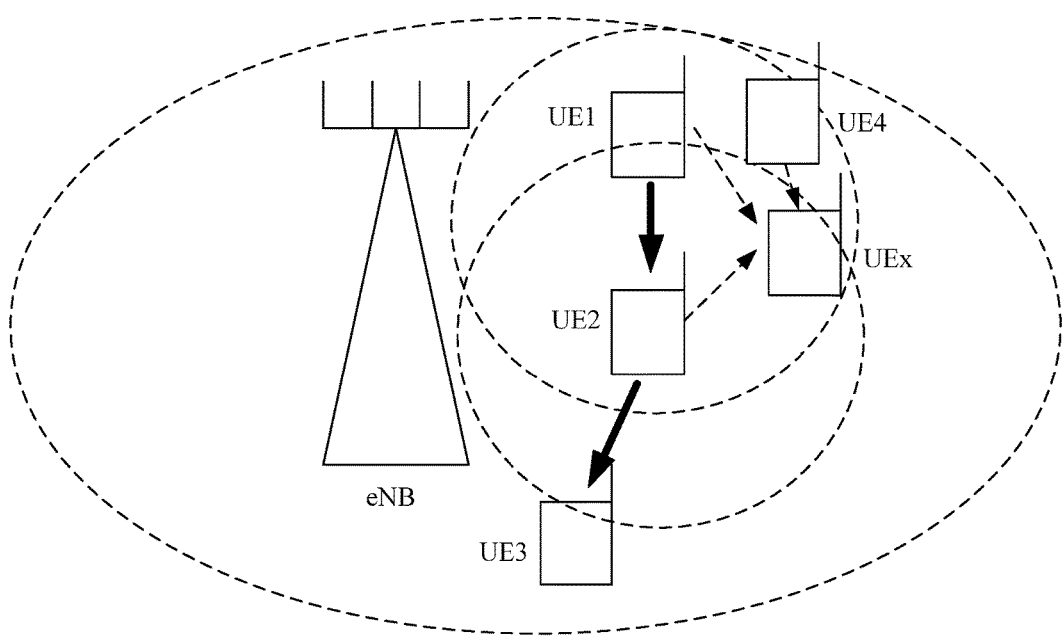
FIG. 1 is a schematic structural diagram of a communications system according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (English full name: Global System of Mobile communication, GSM for short), a Code Division Multiple Access (English full name: Code Division Multiple Access, CDMA for short) system, a Wideband Code Division Multiple Access (English full name: Wideband Code Division Multiple Access, WCDMA for short) system, a general packet radio service (English full name: General Packet Radio Service, GPRS for short), a Long Term Evolution (English full name: Long Term Evolution, LTE for short) system, an LTE frequency division duplex (English full name: Frequency Division Duplex, FDD for short) system, an LTE time division duplex (English full name: Time Division Duplex, TDD for short), a Universal Mobile Telecommunications System (English full name: Universal Mobile Telecommunication System, UMTS for short), and a Worldwide Interoperability for Microwave Access (English full name: Worldwide Interoperability for Microwave Access, WiMAX for short) communications system.

A transmission device provided in the embodiments of the present invention is user equipment (English full name: User Equipment, UE for short), and may be a cellular phone, a cordless phone, a Session Initiation Protocol (English full name: Session Initiation Protocol, SIP for short) telephone, a wireless local loop (English full name: Wireless Local Loop, WLL for short) station, a personal digital assistant (English full name: Personal Digital Assistant, PDA for short), a handheld device having a wireless communication function, an in-vehicle device, a wearable device, a computing device, or another device connected to a wireless modem.

A base station provided in the embodiments of the present invention may be a device that communicates with the user equipment on an air interface on an access network by using one or more sectors. The base station may be configured to convert a received over-the-air frame and an Internet Protocol (English full name: Internet Protocol, IP for short) packet into each other, and serves as a router between the user equipment and a rest portion of the access network. The rest portion of the access network may include an IP network. The base station may further coordinate attribute management of the air interface. The base station may be a base transceiver station (English full name: Base Transceiver Station, BTS for short) in Global System for Mobile Communications (English full name: Global System for Mobile Communication, GSM for short) or Code Division Multiple Access (English full name: Code Division Multiple Access, CDMA for short), or may be a base station (English full name: Base Station, BS for short) in Wideband Code Division Multiple Access (English full name: Wideband Code Division Multiple Access, WCDMA for short), or may be an evolved NodeB (English full name: evolutional Node B, NodeB or eNB or e-NodeB for short) in Long Term Evolution (English full name: Long Term Evolution, LTE for short), or may be a macro base station or a micro base station in a cellular radio communications system. This is not limited in the present invention.

Terms "first" and "second" are used merely for a purpose of description, and shall not be construed as indicating or implying relative importance or implying a quantity of indicated technical features. Therefore, a feature restricted by "first" or "second" may explicitly indicate or implicitly include one or more such features. The "first" and "second" in the following embodiments are merely for distinguishing, for example, a first destination address and a second destination address, a first source address and a second source address, and first data and second data.

An embodiment of the present invention is applied to a communications system shown in FIG. 1. The system includes sending devices UE1 and UE4 and a receiving device UE3 that perform D2D communication, and other transmission devices UE2 and UEx configured to relay and transmit data sent by the sending devices. The communications system provided in this embodiment of the present invention includes a base station eNB. The foregoing UEs are all covered in a coverage area of the eNB. In the prior art, to send a D2D signal, the UE1 needs to send scheduling signaling on a corresponding SA resource, and send a corresponding data signal in a data resource pool matching the SA resource. The scheduling signaling sent by the UE1 on the SA resource includes a destination address of the data signal. Assuming that the UE1 needs to communicate with the UE3, the destination address is an address of the UE3. If the UE2 is used as a relay to forward the D2D signal sent by the UE1, the UE2 needs to first receive data sent by the UE1, and then send the received data. Therefore, when relaying the signal sent by the UE1, the UE2 needs to receive the SA scheduling signaling sent by the UE1. In addition, when relaying the signal sent by the UE1, the UE2 also needs to first send the scheduling signaling on an SA resource, and then send, in a data resource pool matching the SA resource, the data signal that needs to be relayed. That is, in the technical solution provided in the prior art, the UE2 directly relays and transmits data by performing addressing according to the destination address. In this case, to relay data sent by the UE1, the UE2 needs to receive all SA scheduling signaling on the SA resource, receive D2D data indicated by all the SA scheduling signaling, and then relay the received data. In this case, because the SA scheduling signaling does not include other information for distinguishing the data received by the UE2, for example, information such as source addresses of the sending devices and priorities of relaying and forwarding the data, the UE2 needs to simultaneously relay and forward the received data according to an objective in the SA scheduling signaling. As a result, the UE2 may relay data that does not need to be relayed, resulting in resource and energy waste. In an extreme case, this may cause abnormal D2D communication. To resolve this problem, the embodiments of the present invention provide the following solutions.

Figure 2:
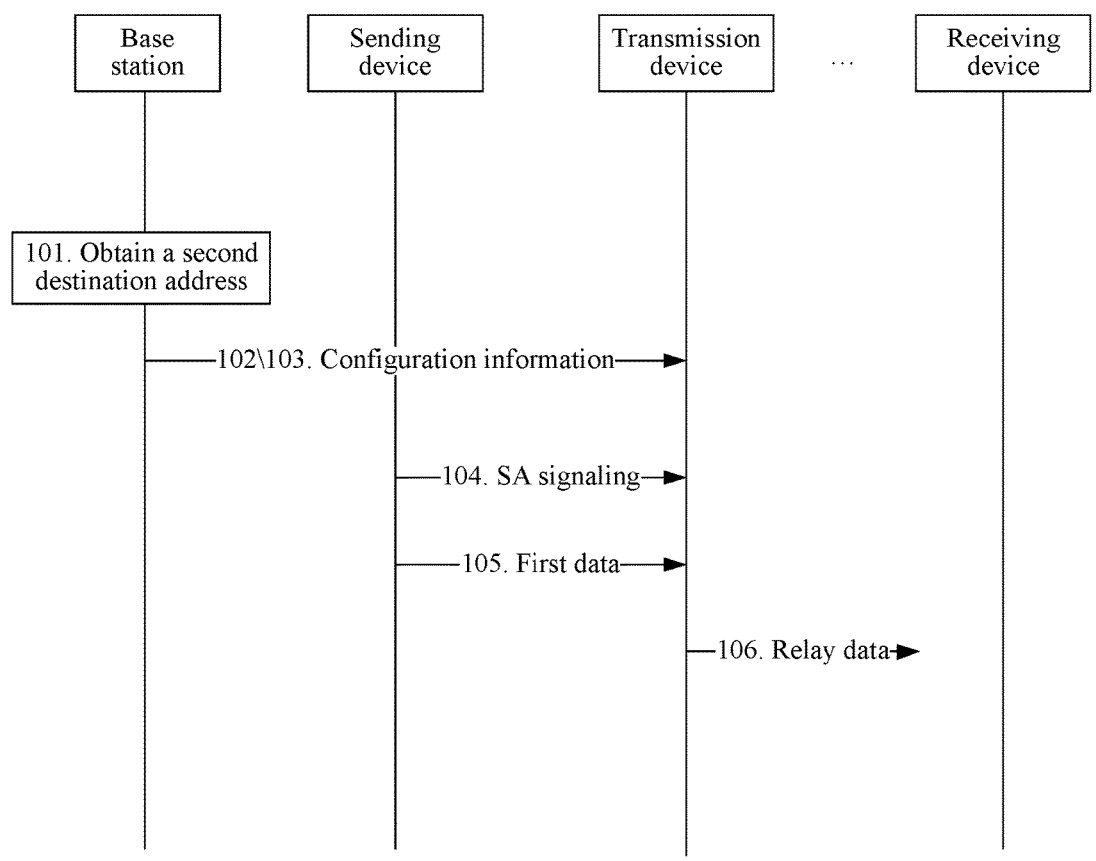
FIG. 2 is a schematic flowchart of a data transmission method according to an embodiment of the present invention.

Referring to FIG. 2, an embodiment of the present invention provides a data transmission method. The method is used in the foregoing communications system and includes the following steps.

101. A base station obtains a second destination address of a receiving device performing D2D communication.

The second destination address is an address of the receiving device performing D2D communication. In this case, because devices performing D2D communication are covered in a same cell that is controlled by the base station or in different cells in which communication can be performed, the base station can obtain the second destination address during communication with the devices performing D2D communication.

102. The base station sends configuration information to a transmission device, where the configuration information includes the second destination address.

The second destination address is used by the transmission device to obtain relay data sent by at least one sending device performing D2D communication with the receiving device.

103. The transmission device obtains the configuration information sent by the base station, where the configuration information includes the second destination address.

104. The transmission device receives scheduling assignment SA signaling sent by the at least one sending device, where the SA signaling is used to indicate data sent by the sending device, the SA signaling includes a first destination address, and the first destination address is the same as the second destination address.

The first destination address is a destination address to which the data is sent. It may be understood that in step 104, the transmission device may match the first destination address in the scheduling assignment SA signaling with the second destination address, and receive only SA signaling that is the same as the second destination address. Alternatively, after receiving all SA signaling, the transmission device performs step 105 merely for SA signaling whose first destination address is the same as the second destination address.

105. The transmission device receives first data, where the first data is data indicated by the SA signaling that is received by the transmission device from the at least one sending device.

106. The transmission device sends relay data, where the relay data is one or more pieces of data of the first data.

In step 105, the first data is specifically received according to the indication of the SA signaling. In step 106, the first data may all be used as relay data and forwarded to another transmission device or receiving device. Certainly, alternatively, the first data may be selectively sent according to actual transmission resources. For example, when the transmission resources are limited, data having a higher requirement on delay may be sent first, or data having a higher sending priority may be sent first. Alternatively, designated relay data may be selected from the first data according to a condition configured by the base station and the designated relay data is sent. This is more beneficial to optimized configuration of data transmission resources in a system, thereby achieving proper use of transmission resources of UE relaying data, and ensuring normal D2D communication.

In the data transmission method provided above, a transmission device can selectively receive SA signaling of a sending device according to a second destination address in configuration information that is sent by a base station, and determine to-be-sent relay data in first data that is obtained according to the received SA signaling. In this way, UE relaying data can be controlled to selectively transmit relay data, to implement normal D2D communication.

Figure 3:
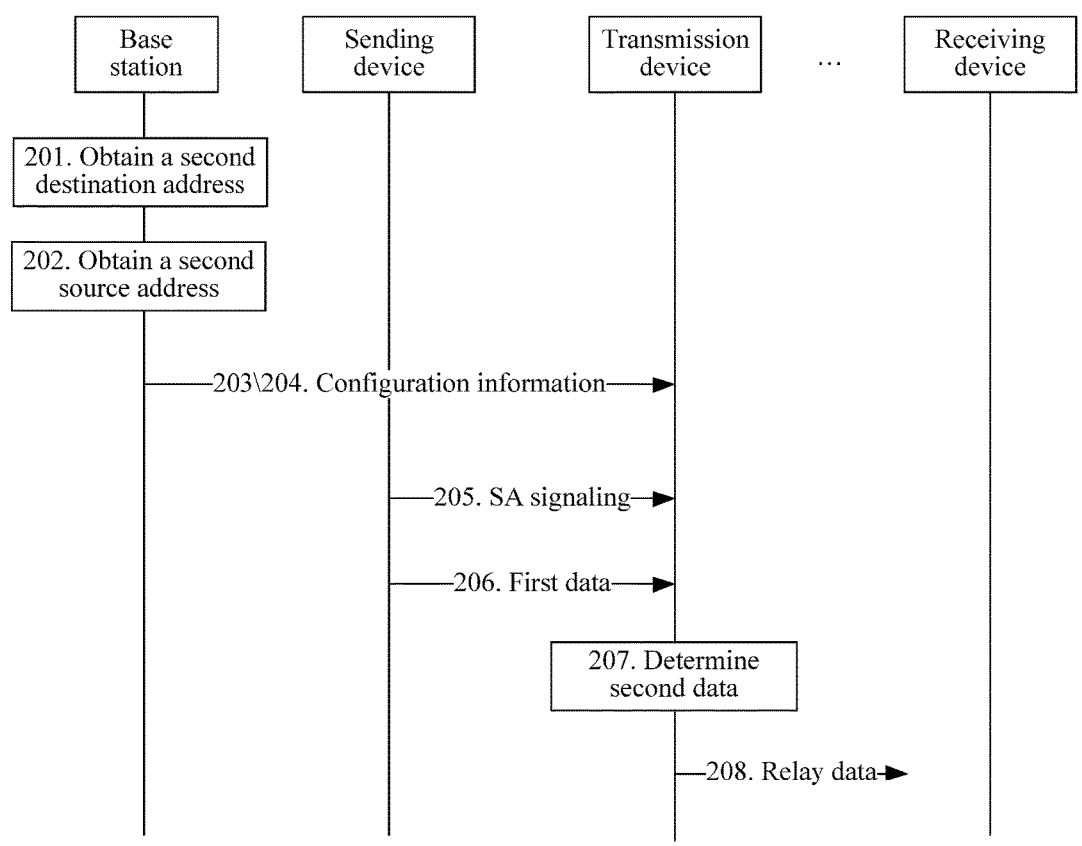
FIG. 3 is a schematic flowchart of a data transmission method according to another embodiment of the present invention.

Referring to FIG. 3, another embodiment of the present invention provides a data transmission method. The method is used in the foregoing communications system and includes the following steps.

201. A base station obtains a second destination address of a receiving device performing D2D communication.

202. The base station obtains a second source address of a sending device performing D2D communication.

A method of obtaining the second source address herein is the same as the method of obtaining the second destination address, and details are not described herein. Sequence numbers of step 201 and step 202 in this embodiment are merely for distinguishing steps, and do not limit time sequences.

203. The base station sends configuration information to a transmission device, where the configuration information includes the second destination address and the second source address.

The second destination address is used by the transmission device to obtain relay data sent by at least one sending device performing D2D communication with the receiving device. The second source address is used by the transmission device to determine second data in first data. The second data is one or more pieces of data of the first data. A first source address included in the second data is the same as the second source address. The first source address is an address of the sending device. The second source address is an address of a sending device designated by the base station, that is, the base station designates data sent by a sending device having the second source address as relay data to be transmitted.

204. The transmission device obtains the configuration information sent by the base station, where the configuration information includes the second destination address and the second source address.

205. The transmission device receives scheduling assignment SA signaling sent by at least one sending device, where the SA signaling is used to indicate data sent by the sending device, the SA signaling includes a first destination address, and the first destination address is the same as the second destination address.

206. The transmission device receives first data, where the first data is the data indicated by the SA signaling that is received by the transmission device from the at least one sending device.

207. The transmission device determines second data in the first data, where the second data is one or more pieces of data of the first data, and a first source address included in the second data is the same as the second source address.

208. The transmission device sends relay data, where the relay data is one or more pieces of data of the second data.

In the data transmission method provided above, a transmission device can selectively receive SA signaling of a sending device according to a second destination address in configuration information that is sent by abase station, obtain first data according to the received SA signaling, determine second data in the first data according to a second source address, and determine to-be-sent relay data in the second data. In this way, UE relaying data can be controlled to selectively transmit relay data, to implement normal D2D communication. Further, because the relay data is determined in the foregoing process by using both the second destination address and the second source address, compared with determining the relay data only according to the destination address, the transmission device can send the relay data in a more targeted manner, to avoid resource and energy waste.

Figure 4:
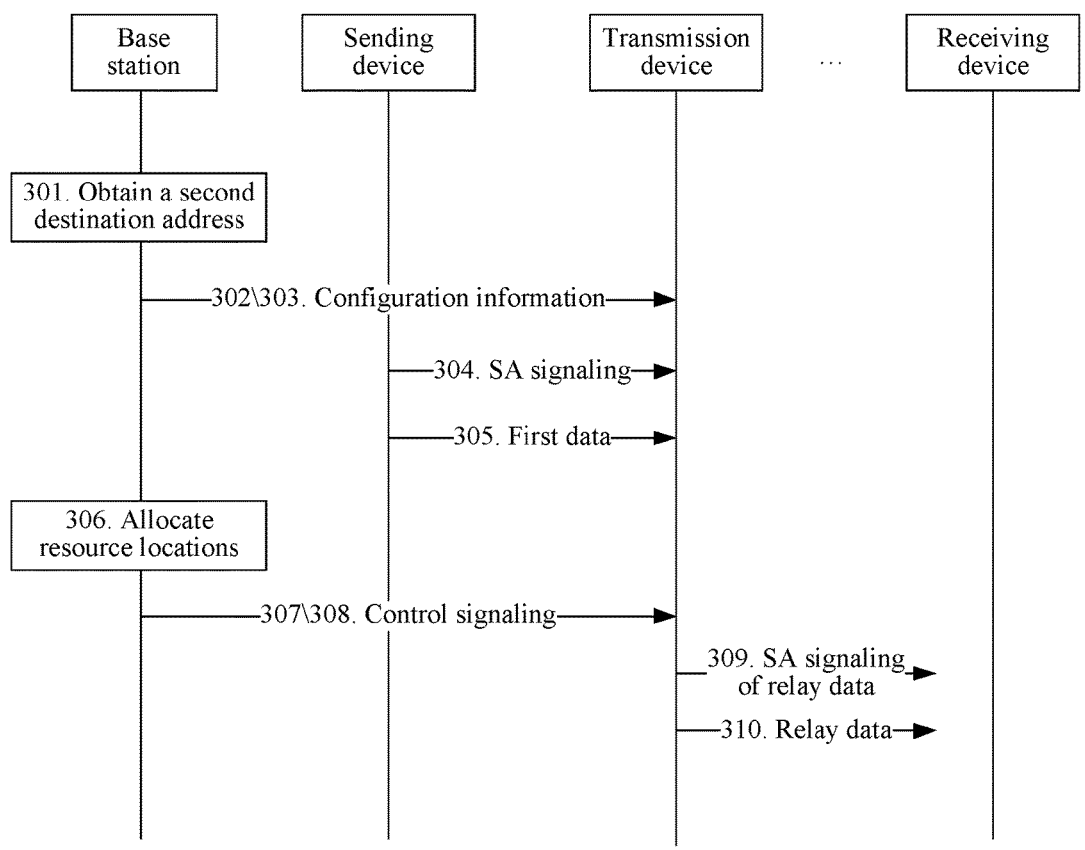
FIG. 4 is a schematic flowchart of a data transmission method according to still another embodiment of the present invention.

Referring to FIG. 4, an embodiment of the present invention provides a data transmission method. The method is used in the foregoing communications system and includes the following steps.

301. A base station obtains a second destination address of a receiving device performing D2D communication.

302. The base station sends configuration information to a transmission device, where the configuration information includes the second destination address and a side link-radio network temporary identifier SL-RNTI.

The second destination address is used by the transmission device to obtain relay data sent by at least one sending device performing D2D communication with the receiving device.

303. The transmission device obtains the configuration information sent by the base station, where the configuration information includes the second destination address and the side link-radio network temporary identifier SL-RNTI.

304. The transmission device receives scheduling assignment SA signaling sent by the at least one sending device, where the SA signaling is used to indicate data sent by the sending device, the SA signaling includes a first destination address, and the first destination address is the same as the second destination address.

305. The transmission device receives first data, where the first data is the data indicated by the SA signaling that is received by the transmission device from the at least one sending device.

306. The base station allocates a resource location of the SA signaling and a resource location of the relay data to the relay data.

The relay data is one or more pieces of data of the first data.

307. The base station sends resource control signaling to the transmission device according to the SL-RNTI, where the resource control signaling includes the resource location of the SA signaling and the resource location of the relay data allocated to the relay data.

308. The transmission device receives, according to the SL-RNTI, the control signaling sent by the base station, where the control signaling indicates the resource location of the SA signaling of the relay data and the resource location of the relay data.

309. The transmission device transmits the SA signaling that corresponds to the relay data in the resource location of the SA signaling of the relay data and according to the control signaling.

310. The transmission device sends the relay data in the resource location of the relay data, where the relay data is one or more pieces of data of the first data.

In the data transmission method provided above, a transmission device can selectively receive SA signaling of a sending device according to a second destination address in configuration information that is sent by abase station, determine to-be-sent relay data in first data that is obtained according to the received SA signaling, and uses control signaling to know a resource location of the SA signaling and a resource location of the relay data allocated to transmit the relay data. In this way, UE relaying data can be controlled to selectively transmit relay data, to implement normal D2D communication.

Figure 5:
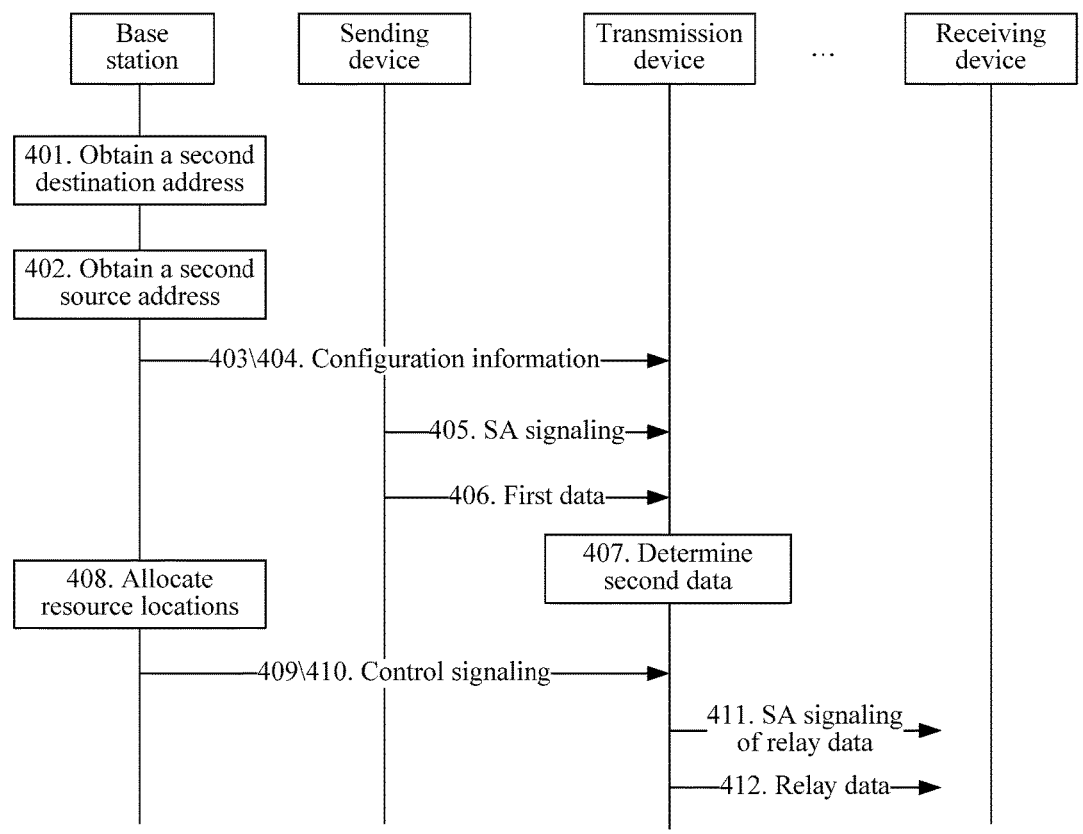
FIG. 5 is a schematic flowchart of a data transmission method according to yet another embodiment of the present invention.

Referring to FIG. 5, another embodiment of the present invention provides a data transmission method. The method is used in the foregoing communications system and includes the following steps:

401. A base station obtains a second destination address of a receiving device performing D2D communication.

402. The base station obtains a second source address of a sending device performing D2D communication.

Sequence numbers of step 401 and step 402 in this embodiment are merely for distinguishing steps, and do not limit time sequences.

403. The base station sends configuration information to a transmission device, where the configuration information includes the second destination address, the second source address, and an SL-RNTI.

The second destination address is used by the transmission device to obtain relay data sent by at least one sending device performing D2D communication with the receiving device. The second source address is used by the transmission device to determine second data in first data. The second data is one or more pieces of data of the first data. A first source address included in the second data is the same as the second source address.

404. The transmission device obtains the configuration information sent by the base station, where the configuration information includes the second destination address, the second source address, and the side link-radio network temporary identifier SL-RNTI.

405. The transmission device receives scheduling assignment SA signaling sent by the at least one sending device, where the SA signaling is used to indicate data sent by the sending device, the SA signaling includes a first destination address, and the first destination address is the same as the second destination address.

406. The transmission device receives first data, where the first data is the data indicated by the SA signaling that is received by the transmission device from the at least one sending device.

407. The transmission device determines second data in the first data, where the second data is one or more pieces of data of the first data, and a first source address included in the second data is the same as the second source address.

408. The base station allocates a resource location the SA signaling and a resource location of the relay data to the relay data, where the relay data is one or more pieces of data of the second data.

409. The base station sends resource control signaling to the transmission device according to the SL-RNTI, where the resource control signaling includes the resource location of the SA signaling and the resource location of the relay data allocated to the relay data.

410. The transmission device receives, according to the SL-RNTI, the control signaling sent by the base station, where the control signaling indicates the resource location of the SA signaling of the relay data and the resource location of the relay data.

411. The transmission device transmits the SA signaling that corresponds to the relay data in the resource location of the SA signaling of the relay data and according to the control signaling.

412. The transmission device sends the relay data in the resource location of the relay data, where the relay data is one or more pieces of data of the second data.

In the data transmission method provided above, a transmission device can selectively receive SA signaling of a sending device according to a second destination address in configuration information sent by a base station, obtain first data according to the received SA signaling, and determine second data in the first data according to a second source address, determine relay data in the second data, and uses control signaling to know a resource location of the SA signaling and a resource location of the relay data allocated to transmit the relay data. In this way, UE relaying data can be controlled to selectively transmit relay data, to implement normal D2D communication. Further, because the relay data is determined in the foregoing process by using both the second destination address and the second source address, compared with determining the relay data only according to the destination address, the transmission device can send the relay data in a more targeted manner, to avoid resource and energy waste.

Figure 6:
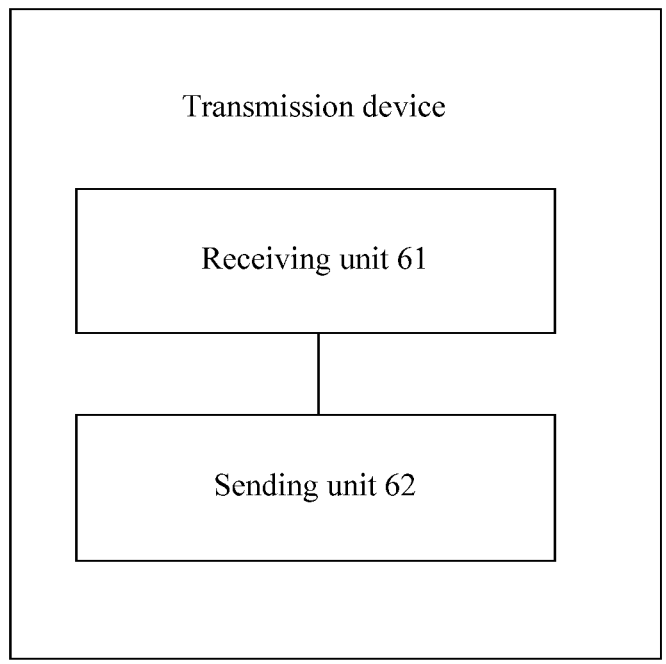
FIG. 6 is a schematic structural diagram of a transmission device according to an embodiment of the present invention.

Referring to FIG. 6, an embodiment of the present invention provides a transmission device. The transmission device is used in the foregoing data transmission method and includes:

a receiving unit 61, configured to obtain configuration information sent by a base station, where the configuration information includes a second destination address, and the second destination address is an address of a receiving device performing D2D communication, where the receiving unit 61 is further configured to receive scheduling assignment SA signaling sent by at least one sending device, where the SA signaling is used to indicate data sent by the sending device, the SA signaling includes a first destination address, the first destination address is the same as the second destination address, and the first destination address is a destination address to which the data is sent; and the receiving unit 61 is further configured to receive first data, where the first data is the data indicated by the SA signaling that is received by the transmission device from the at least one sending device; and a sending unit 62, configured to send relay data, where the relay data is one or more pieces of data of the first data.

The transmission device provided above can selectively receive the SA signaling of the sending device according to the second destination address in the configuration information that is sent by the base station, and determine to-be-sent relay data in the first data that is obtained according to the received SA signaling. In this way, UE relaying data can be controlled to selectively transmit relay data, to implement normal D2D communication.

Figure 7:
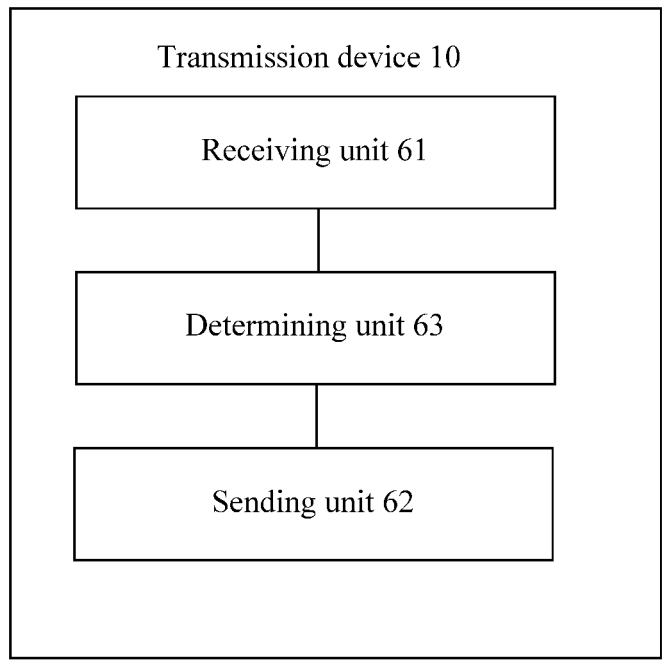
FIG. 7 is a schematic structural diagram of a transmission device according to another embodiment of the present invention.

Further, the first data includes a first source address. The configuration information further includes a second source address. The first source address is an address of the at least one sending device. Referring to FIG. 7, the transmission device further includes:

a determining unit 63, configured to determine second data in the first data received by the receiving unit 61, where the second data is one or more pieces of data of the first data, the first source address included in the second data is the same as the second source address, and the relay data is one or more pieces of data of the second data.

Because the transmission device can determine the relay data by using both the second destination address and the second source address, compared with determining the relay data only according to the destination address, the transmission device can send the relay data in a more targeted manner, to avoid resource and energy waste.

Further, the configuration information further includes a side link-radio network temporary identifier SL-RNTI.

The receiving unit 61 is further configured to receive, according to the SL-RNTI, the control signaling sent by the base station. The control signaling indicates a resource location of SA signaling of the relay data and a resource location of the relay data.

The sending unit 62 is configured to transmit the SA signaling that corresponds to the relay data in the resource location of the SA signaling of the relay data and according to the control signaling received by the receiving unit 61.

The sending unit 62 is specifically configured to send the relay data in the resource location of the relay data.

The transmission device in the foregoing solution uses the control signaling to know the resource location of the SA signaling and the resource location of the relay data allocated to transmit the relay data. In this way, UE relaying data can be controlled to selectively transmit relay data, to implement normal D2D communication.

It should be noted that the receiving unit 61 in this embodiment may be a receiver of the transmission device, and the sending unit 62 may be a transmitter of the transmission device. Certainly, a transceiver having a transmission and reception function and into which a receiver and a transmitter are integrated may be used. The receiver and the transmitter may be implemented by using interface circuits having corresponding functions. The determining unit 63 may be a separate processor, or may be integrated into a processor of the transmission device. In addition, the determining unit 63 may be stored in a memory of the transmission device in a form of program code, and a function of the determining unit 63 is invoked and performed by a processor in the transmission device. The processor described herein may be a central processing unit (English full name: Central Processing Unit, CPU for short), or an application-specific integrated circuit (English full name: Application Specific Integrated Circuit, ASIC for short), or may be one or more integrated circuits configured to implement this embodiment of the present invention.

Figure 8:
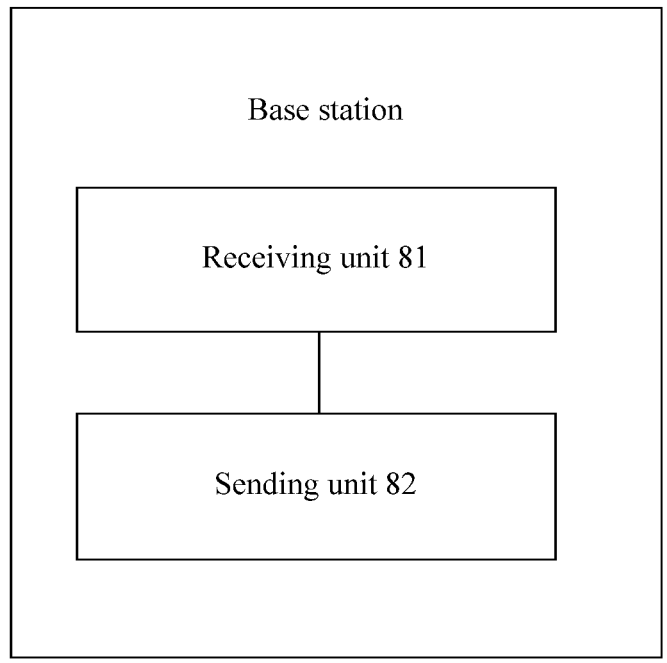
FIG. 8 is a schematic structural diagram of a base station according to an embodiment of the present invention.

An embodiment of the present invention provides a base station. The base station is configured to implement the foregoing data transmission method. Referring to FIG. 8, the base station includes:

a receiving unit 81, configured to obtain a second destination address of a receiving device performing D2D communication; and a sending unit 82, configured to send configuration information to a transmission device, where the configuration information includes the second destination address, and the second destination address is used by the transmission device to obtain relay data sent by at least one sending device performing D2D communication with the receiving device.

The base station provided above can send the configuration information to the transmission device, so that the transmission device can selectively receive SA signaling of the sending device according to the second destination address in the configuration information that is sent by the base station, and determine to-be-sent relay data in first data that is obtained according to the received SA signaling. In this way, UE relaying data can be controlled to selectively transmit relay data, to implement normal D2D communication.

Further, the configuration information further includes a second source address.

The receiving unit 81 is further configured to obtain the second source address of the sending device performing D2D communication.

The second source address is used by the transmission device to determine second data in first data. The second data is one or more pieces of data of the first data. A first source address included in the second data is the same as the second source address.

Because the configuration information sent by the base station to the transmission device further includes the second source address, the transmission device can determine the relay data by using both the second destination address and the second source address, compared with determining the relay data only according to the destination address, the transmission device can send the relay data in a more targeted manner, to avoid resource and energy waste.

Figure 9:
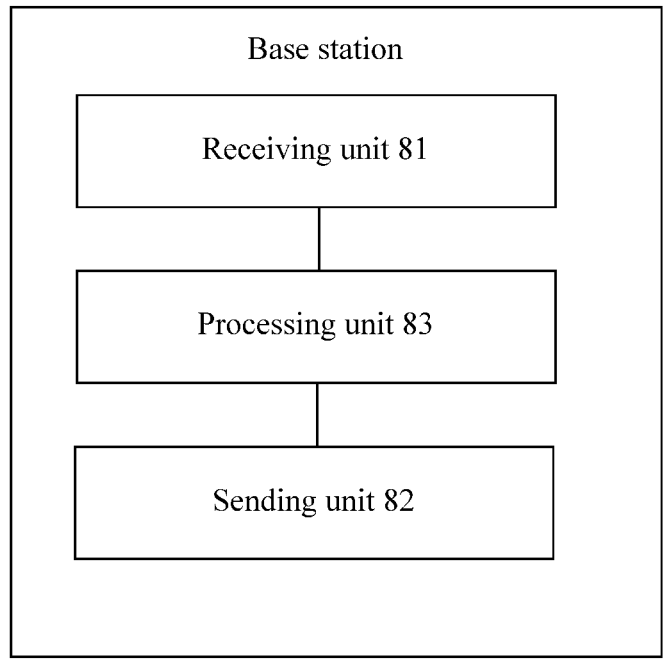
FIG. 9 is a schematic structural diagram of a base station according to another embodiment of the present invention.

Further, the configuration information further includes an SL-RNTI. Referring to FIG. 9, the base station further includes a processing unit 83, configured to allocate a resource location of the SA signaling and a resource location of the relay data to the relay data.

The sending unit 82 is further configured to send resource control signaling to the transmission device according to the SL-RNTI. The resource control signaling includes the resource location of the SA signaling and the resource location of the relay data allocated to the relay data.

In the foregoing solution, the base station further sends the control signaling to the transmission device, and the transmission device uses the control signaling to know the resource location of the SA signaling and the resource location of the relay data allocated to transmit the relay data. In this way, UE relaying data can be controlled to selectively transmit relay data, to implement normal D2D communication.

It should be noted that the receiving unit 81 in this embodiment may be a receiver of the transmission device, and the sending unit 82 may be a transmitter of the transmission device. Certainly, a transceiver having a transmission and reception function and into which a receiver and a transmitter are integrated may be used. The receiver and the transmitter may be implemented by using interface circuits having corresponding functions. The determining unit 83 may be a separate processor, or may be integrated into a processor of the transmission device. In addition, the determining unit 83 may be stored in a memory of the transmission device in a form of program code, and a function of the determining unit 83 is invoked and performed by a processor in the transmission device. The processor described herein may be a central processing unit (English full name: Central Processing Unit, CPU for short), or an application-specific integrated circuit (English full name: Application Specific Integrated Circuit, ASIC for short), or may be one or more integrated circuits configured to implement this embodiment of the present invention.

Figure 10:
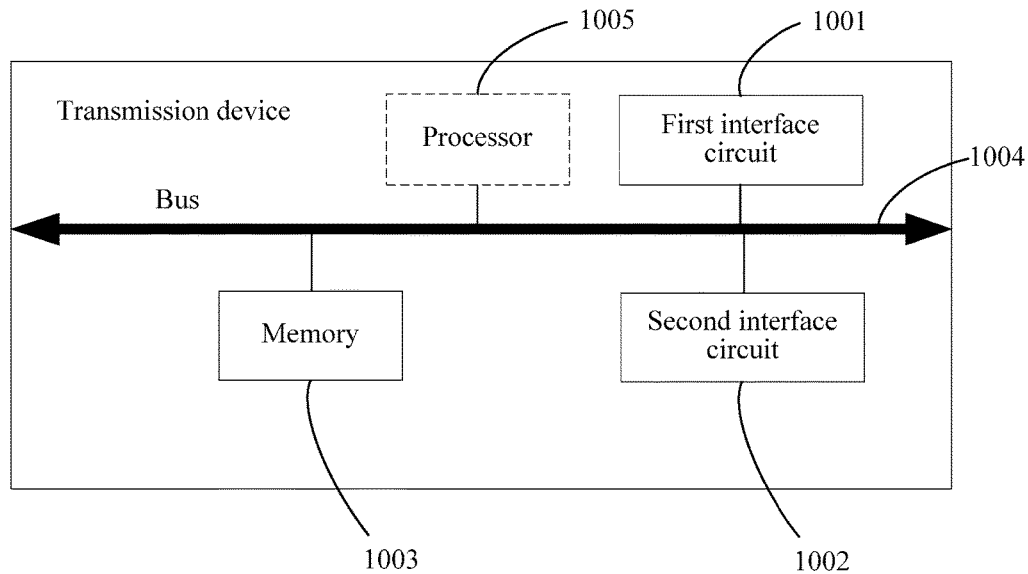
FIG. 10 is a schematic structural diagram of a transmission device according to still another embodiment of the present invention.

An embodiment of the present invention provides a transmission device, configured to implement the data transmission method provided in the foregoing embodiments. Referring to FIG. 10, the transmission device includes: a first interface circuit 1001, a second interface circuit 1002, a memory 1003, and a bus 1004. The first interface circuit 1001, the second interface circuit 1002, and the memory 1003 are connected and communicate with each other by using the bus 1004.

It should be noted that the memory 1003 herein may be one storage apparatus, or may be a generic name of multiple storage elements, and is configured to store executable program code, or parameters, data, and the like required during operation of an access network management device. Further, the memory 1003 may include a random access memory (English full name: Random-Access Memory, RAM for short), or may include a nonvolatile memory (English full name: non-volatile memory, NVRAM for short) such as a magnetic disk memory or a flash memory (English: Flash).

The bus 1004 may be an industry standard architecture (English full name: Industry Standard Architecture, ISA for short) bus, a peripheral component interconnect (English full name: Peripheral Component, PCI for short) bus, an expanded industry standard architecture (English full name: Expanded Industry Standard Architecture, EISA for short) bus, or the like. The bus 1004 may be classified into an address bus, a data bus, a control bus, and the like. For convenience of representation, only one bold line is used for representation in FIG. 10, but this does not indicate that there is only one bus or one type of bus.

The first interface circuit 1001 is configured to obtain configuration information sent by a base station. The configuration information includes a second destination address. The second destination address is an address of a receiving device performing D2D communication.

The first interface circuit 1001 is further configured to receive scheduling assignment SA signaling sent by at least one sending device. The SA signaling is used to indicate data sent by the sending device. The SA signaling includes a first destination address. The first destination address is the same as the second destination address. The first destination address is a destination address to which the data is sent.

The first interface circuit 1001 is further configured to receive first data. The first data is the data indicated by the SA signaling that is received by the transmission device from the at least one sending device.

The second interface circuit 1002 is configured to send relay data. The relay data is one or more pieces of data of the first data.

The transmission device provided above can selectively receive the SA signaling of the sending device according to the second destination address in the configuration information that is sent by the base station, and determine to-be-sent relay data in the first data that is obtained according to the received SA signaling. In this way, UE relaying data can be controlled to selectively transmit relay data, to implement normal D2D communication.

Further, the first data includes a first source address. The configuration information further includes a second source address. The first source address is an address of the at least one sending device. The transmission device further includes a processor 1005 connected to the bus 1004.

The processor 1005 may be one processor, or may be a generic name of multiple processing elements. For example, the processor may be a central processing unit CPU, or may be an application-specific integrated circuit ASIC, or may be one or more integrated circuits configured to implement this embodiment of the present invention, for example, one or more microprocessors (English full name: digital signal processor, DSP for short), or one or more field programmable gate arrays (English full name: Field Programmable Gate Array, FPGA for short).

The processor 1005 is configured to determine second data in the first data received by the first interface circuit 1001. The second data is one or more pieces of data of the first data. The first source address included in the second data is the same as the second source address. The relay data is one or more pieces of data of the second data.

Because the transmission device can determine the relay data by using both the second destination address and the second source address, compared with determining the relay data only according to the destination address, the transmission device can send the relay data in a more targeted manner, to avoid resource and energy waste.

Further, the configuration information further includes a side link-radio network temporary identifier SL-RNTI.

The first interface circuit 1001 is further configured to receive, according to the SL-RNTI, control signaling sent by the base station. The control signaling indicates a resource location of SA signaling of the relay data and a resource location of the relay data.

The second interface circuit 1002 is configured to transmit the SA signaling that corresponds to the relay data in the resource location of the SA signaling of the relay data and according to the control signaling received by the first interface circuit 1001.

The second interface circuit 1002 is specifically configured to send the relay data in the resource location of the relay data.

The transmission device in the foregoing solution uses the control signaling to know the resource location of the SA signaling and the resource location of the relay data allocated to transmit the relay data. In this way, UE relaying data can be controlled to selectively transmit relay data, to implement normal D2D communication.

Figure 11:
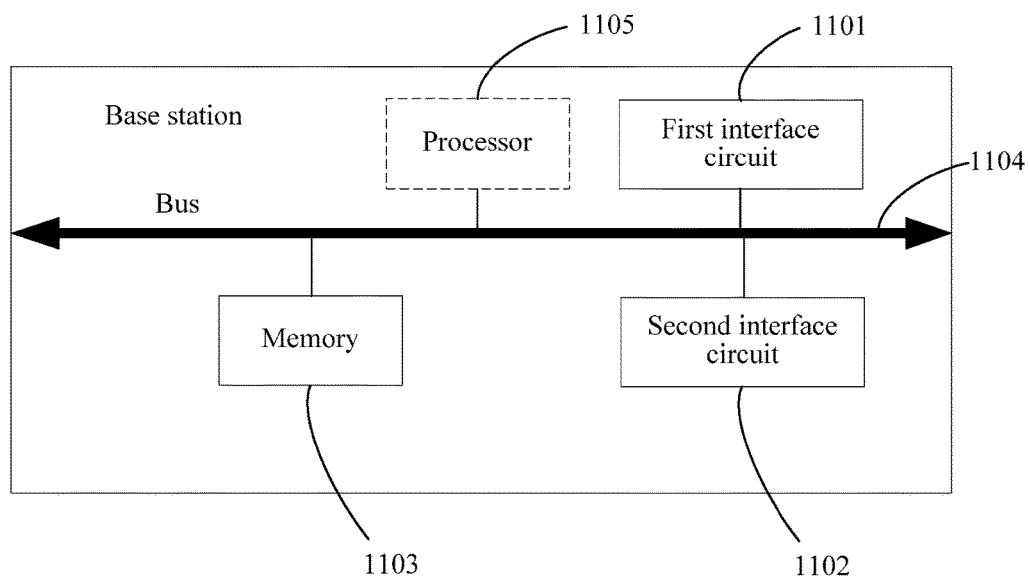
FIG. 11 is a schematic structural diagram of a base station according to still another embodiment of the present invention.

An embodiment of the present invention provides abase station, configured to implement the foregoing data transmission method. Referring to FIG. 11, the base station includes: a first interface circuit 1101, a second interface circuit 1102, a memory 1103, and a bus 1104. The first interface circuit 1101, the second interface circuit 1102, and the memory 1103 are connected by using the bus 1104 and communicate with each other.

It should be noted that the memory 1103 herein may be one storage apparatus, or may be a generic name of multiple storage elements, and is configured to store executable program code, or parameters, data, and the like required during operation of an access network management device. Further, the memory 1103 may include a random access memory (English full name: Random-Access Memory, RAM for short), or may include a nonvolatile memory (English full name: non-volatile memory, NVRAM for short) such as a magnetic disk memory or a flash memory (Flash).

The bus 1104 may be an industry standard architecture (English full name: Industry Standard Architecture, ISA for short) bus, a peripheral component interconnect (English full name: Peripheral Component, PCI for short) bus, an expanded industry standard architecture (English full name: Expanded Industry Standard Architecture, EISA for short) bus, or the like. The bus 1104 may be classified into an address bus, a data bus, a control bus, and the like. For convenience of representation, only one bold line is used for representation in FIG. 11, but this does not indicate that there is only one bus or one type of bus.

The first interface circuit 1101 is configured to obtain a second destination address of a receiving device performing D2D communication.

The second interface circuit 1102 is configured to send configuration information to a transmission device. The configuration information includes the second destination address, and the second destination address is used by the transmission device to obtain relay data sent by at least one sending device performing D2D communication with the receiving device.

The base station provided above can send the configuration information to the transmission device, so that the transmission device can selectively receive SA signaling of the sending device according to the second destination address in the configuration information that is sent by the base station, and determine to-be-sent relay data in first data that is obtained according to the received SA signaling. In this way, UE relaying data can be controlled to selectively transmit relay data, to implement normal D2D communication.

Further, the configuration information further includes the second source address.

The first interface circuit 1101 is further configured to obtain the second source address of the sending device performing D2D communication.

The second source address is used by the transmission device to determine second data in first data. The second data is one or more pieces of data of the first data. A first source address included in the second data is the same as the second source address.

Because the configuration information sent by the base station to the transmission device further includes the second source address, the transmission device can determine the relay data by using both the second destination address and the second source address, compared with determining the relay data only according to the destination address, the transmission device can send the relay data in a more targeted manner, to avoid resource and energy waste.

Further, the configuration information further includes an SL-RNTI.

The base station further includes a processor 1105 connected with the bus 1104. The processor 1105 herein may be one processor, or may be a generic name of multiple processing elements. For example, the processor may be a central processing unit CPU, or may be an application-specific integrated circuit ASIC, or may be one or more integrated circuits configured to implement this embodiment of the present invention, for example, one or more microprocessors (English full name: digital signal processor, DSP for short), or one or more field programmable gate arrays (English full name: Field Programmable Gate Array, FPGA for short).

The processor 1105 is configured to allocate a resource location of the SA signaling and a resource location of the relay data to the relay data.

The second interface circuit 1102 is further configured to send resource control signaling to the transmission device according to the SL-RNTI. The resource control signaling includes the resource location of the SA signaling and the resource location of the relay data allocated to the relay data.

In the foregoing solution, the base station further sends the control signaling to the transmission device, and the transmission device uses the control signaling to know the resource location of the SA signaling and the resource location of the relay data allocated to transmit the relay data. In this way, UE relaying data can be controlled to selectively transmit relay data, to implement normal D2D communication.

In addition, a computer program product is further provided, including the foregoing computer readable medium.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, and the like) to perform all or some of the steps of the methods described in the embodiments of the present invention. The foregoing storage medium includes: any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
  obtaining, by a transmission device, configuration information sent by a base station, wherein the configuration information comprises a second destination address, and the second destination address is an address of a receiving device performing device to device (D2D) communication;
  receiving, by the transmission device, scheduling assignment (SA) signaling sent by at least one sending device for indicating data sent by the sending device, the SA signaling comprises a first destination address, the first destination address is the same as the second destination address, and the first destination address is a destination address to which the data is sent;
  receiving, by the transmission device, first data, wherein the first data is the data indicated by the SA signaling that is received by the transmission device from the at least one sending device; and
  sending, by the transmission device, relay data comprising one or more pieces of data of the first data.

2. The method according to claim 1, wherein:
  the first data comprises a first source address, the configuration information further comprises a second source address, and the first source address is an address of the at least one sending device;
  the method further comprises:
    determining, by the transmission device, second data in the first data, wherein the second data is one or more pieces of data of the first data, and the first source address comprised in the second data is the same as the second source address; and
  the relay data comprises one or more pieces of data of the second data.

3. The method according to claim 1, wherein:
  the configuration information further comprises a side link-radio network temporary identifier (SL-RNTI);
  the method further comprises:
    receiving, by the transmission device according to the SL-RNTI, control signaling sent by the base station for indicating a resource location of SA signaling of the relay data and a resource location of the relay data, and
    transmitting, by the transmission device, the SA signaling that corresponds to the relay data in the resource location of the SA signaling of the relay data and according to the control signaling; and
  sending, by the transmission device, relay data comprises:
    sending, by the transmission device, the relay data in the resource location of the relay data.

4. A data transmission method, comprising:
  obtaining, by a base station, a second destination address of a receiving device performing device to device (D2D) communication;
  sending, by the base station, configuration information to a transmission device, wherein the configuration information comprises the second destination address for enabling the transmission device to obtain relay data sent by at least one sending device performing D2D communication with the receiving device, the configuration information further comprising a second source address of the sending device performing D2D communication with the receiving device; and
  obtaining, by the base station, the second source address of the sending device performing D2D communication for enabling the transmission device to determine second data in first data, wherein the second data comprises one or more pieces of data of the first data, and a first source address comprised in the second data is the same as the second source address.

5. A data transmission method, comprising:
  obtaining, by a base station, a second destination address of a receiving device performing device to device (D2D) communication;
  sending, by the base station, configuration information to a transmission device, wherein the configuration information comprises the second destination address for enabling the transmission device to obtain relay data sent by at least one sending device performing D2D communication with the receiving device, the configuration information further comprises a side link-radio network temporary identifier (SL-RNTI);

allocating, by the base station, a resource location of scheduling assignment (SA) signaling and a resource location of the relay data to the relay data; and sending, by the base station, resource control signaling to the transmission device according to the SL-RNTI, wherein the resource control signaling comprises the resource location of the SA signaling and the resource location of the relay data allocated to the relay data.

6. A transmission device, comprising:
a first interface circuit configured to:
 obtain configuration information sent by a base station, wherein the configuration information comprises a second destination address, and the second destination address is an address of a receiving device performing device to device (D2D) communication,
 receive scheduling assignment (SA) signaling sent by at least one sending device for indicating data sent by the sending device, the SA signaling comprises a first destination address, the first destination address is the same as the second destination address, and the first destination address is a destination address to which the data is sent, and
 receive first data, wherein the first data is the data indicated by the SA signaling that is received by the transmission device from the at least one sending device;
a second interface circuit configured to send relay data, wherein the relay data comprises one or more pieces of data of the first data; and
a memory and a bus coupled to the first interface circuit and the second interface circuit.

7. The transmission device according to claim 6, wherein:
the first data comprises a first source address, the configuration information further comprises a second source address, and the first source address is an address of the at least one sending device; and
the transmission device further comprises a processor coupled to the bus and configured to determine second data in the first data received by the first interface circuit, wherein the second data comprises one or more pieces of data of the first data, the first source address comprised in the second data is the same as the second source address, and the relay data is one or more pieces of data of the second data.

8. The transmission device according to claim 6, wherein:
the configuration information further comprises a side link-radio network temporary identifier (SL-RNTI);
the first interface circuit is further configured to receive, according to the SL-RNTI, control signaling sent by the base station for indicating a resource location of SA signaling of the relay data and a resource location of the relay data; and
the second interface circuit is configured to:
 transmit the SA signaling that corresponds to the relay data in the resource location of the SA signaling of the relay data and according to the control signaling received by the first interface circuit, and
 send the relay data in the resource location of the relay data.

* * * * *